United States Patent
Castro et al.

(10) Patent No.: US 6,203,609 B1
(45) Date of Patent: Mar. 20, 2001

(54) FIBER REINFORCED CELLULAR CONCRETE

(76) Inventors: Magdiel Castro, 10825 SW. 112 Ave.; Osvaldo Moran, 12180 SW. 87 Ave., both of Miami, FL (US) 33176

( * ) Notice: Subject to any disclaimer, the term of this patent is extended or adjusted under 35 U.S.C. 154(b) by 0 days.

(21) Appl. No.: 09/371,891

(22) Filed: Aug. 9, 1999

(51) Int. Cl.⁷ ..................................... C04B 07/12

(52) U.S. Cl. ...................................... 106/705; 106/DIG. 1

(58) Field of Search ........................ 106/705; 116/DIG. 1

(56) References Cited

U.S. PATENT DOCUMENTS 5,397,516 * 3/1995 Sikaffy ................................. 264/42

\* cited by examiner

*Primary Examiner*—Paul Marcantoni
(74) *Attorney, Agent, or Firm*—J. Sanchelima

(57) ABSTRACT

The present fiber reinforced cellular concrete is produced through a chemical reaction that does not require high heat or pressure ovens (autoclaves). Among its unique features, is the fact that different compression strengths can be obtained by varying the proportion of ingredients and resulting densities. The concrete utilizes a base of a pozzolanic product with aluminum powder, calcium carbonate, calcium formate, cement, and polypropylene fiber is added, along with water. Optionally, sand and compatible reinforcing material can also be added.

6 Claims, No Drawings

FIBER REINFORCED CELLULAR CONCRETE

BACKGROUND OF THE INVENTION

1. Field of the Invention

The present invention relates to fiber reinforced cellular concrete, and more particularly, to a fiber reinforced cellular concrete to be used in applications where the density and compression strength characteristics of the construction material can be selectively adjusted

2. Description of the Related Art

It is desirable for construction applications to use cementitious materials that are lightweight while maintaining an acceptable structural strength. The incorporation of fly ash and pozzolanic products in combination with Portland cement offers several advantages. The alkali released in the formation of concrete react with elements in fly ash increasing compressive strength and reducing the leeching effect produced by the combination of cement with water, thus preventing corrosion in reinforcing metals. I addition to lowering the cost of concrete, the use of fly ash, slag and other recyclable industrial wastes is compatible with ever increasing ecological concerns.

The present fiber reinforced cellular concrete is, unlike traditional cellular concretes, produced without requiring high heat pressure ovens (autoclaves). Among its unique features, is the fact that different compression strengths can be obtained by varying the proportion of ingredients and resulting densities. The concrete utilizes a base of a pozzolanic product mixed with aluminum powder, calcium carbonate, calcium formate and fiber along with water. Optionally, reinforcing material can also be added.

Applicant believes that the closest reference corresponds to U.S. Pat. No. 5,397,516 issued to Sikaffy on Mar. 14, 1995 and assigned to Thermo Cement Engineering Corp. However, it differs from the present invention because it does not require raising the temperature, permits the use of fly ash and any pozzolanic product as well as regular sand with the consequent ability to adjust the compression strength of the material to predetermined levels and does not require the use of ferric chloride or magnesium fluorsilicate. Additionally, the present invention does not require a high speed mixer, as in the patented invention.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a cementicious construction material that can be produced at any temperature.

It is another object of this invention to provide a material that uses fly ash, pozzolanic product, and sand in different proportions, and in extreme situations, uses exclusively fly ash or bottom furnice slag or combination of both instead of Portland cement.

It is still another object of the present invention to provide a material that does not require the use of ferric chloride or other corrosive materials.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

DETAILED DESCRIPTION OF THE PREFERRED EMBODIMENT

The present invention is a cementicious material that depending on the proportions, will have different densities and compression strength coefficients.

The ingredients are water, a pozzolanic material, aluminum powder, calcium carbonate, calcium formate, polypropylene fiber, cement, sand, and compatible reinforcement material (optimal). The following table provides the ranges for the best results obtained in one column and one specific formulation used a construction application involving construction of wall members, normalized for 100 Kg. of cellular concrete.

| Ingredient | Range | Specific Formula |
| --- | --- | --- |
| 1. Pozzolanic product | 1–69.75 Kg. | 49.81 Kg. |
| 2. Water | 30–70 Kg. | 32.53 Kg. |
| 3. Aluminum powder | 0.05–0.12 Kg. | 0.110 Kg. |
| 4. Calcium carbonate (hydrated lime) | 0.15–0.2 Kg. | 0.165 Kg. |
| 5. Calcium formate | 0.05–0.12 Kg. | 0.110 Kg. |
| 6. Polypropilene fiber | 0–0.8 Kg. | 0.675 Kg. |
| 7. Cement | 0–68.75 Kg. | 16.60 Kg. |
| 8. Sand | 0–30 Kg. | optional |
| 9. Reinforcement material | 0-as required | optional |

The pozzolanic products could be fly ash, bottom slag or coal ash.

The fiber used can be any fibers (natural or synthetic) such polypropylene fibers. The reinforcement material can be: metals, such as iron rebars, steel forms, galvanized metals V's, and aluminium forms; and plastics such as carbon based, silicone based, and polypropylene.

What is claimed is:

1. A compound to be used in construction applications, consisting essentially of:

A) between 1 and 69.75 Kg. of a pozzolana;

B) water between 30 and 70 Kg.;

C) aluminum powder between 0.05 and 0.12 Kg.;

D) hydrated lime between 0.15 and 0.2 Kg.; and

E) calcium formate between 0.05 and 0.12 Kg. so that the total resulting compound weighs 100 Kg.

2. The compound set forth in claim 1 further comprising:

F) up to 0.8 Kg. of polypropylene fiber.

3. The compound set forth in claim 2 further comprising:

G) up to 68.75 Kg. of cement.

4. The compound set forth in claim 3 further comprising:

H) up to 30 Kg. of sand.

5. The compound set forth in claim 4 further comprising:

I) a reinforcement material.

6. The compound set forth in claim 5 where said reinforcement material includes at least one element selected from the group consisting of iron, steel, galvanized metal, aluminum, carbon containing plastics, silicon containing plastics, and polypropylene.

* * * * *